May 18, 1937. W. R. PETERSON 2,080,741
KNIFE WEEDER
Filed June 14, 1935
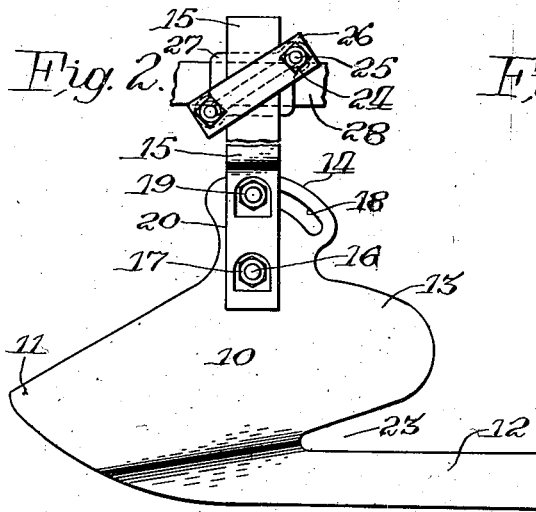
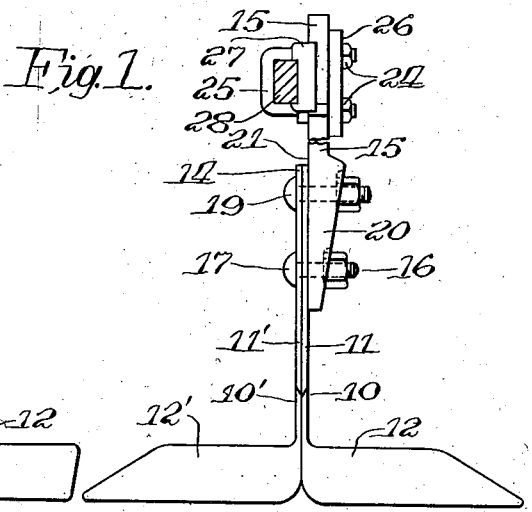
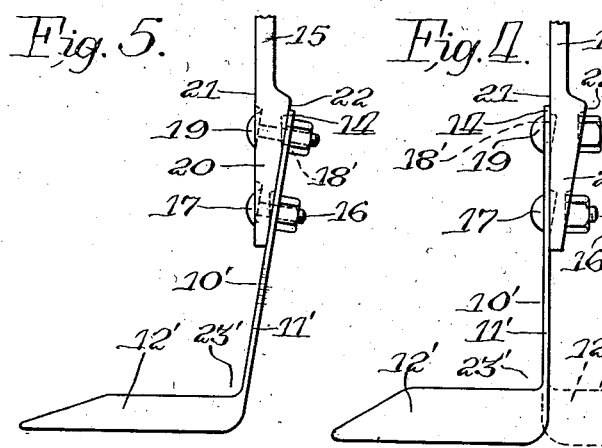
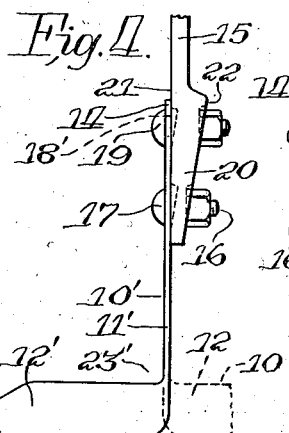
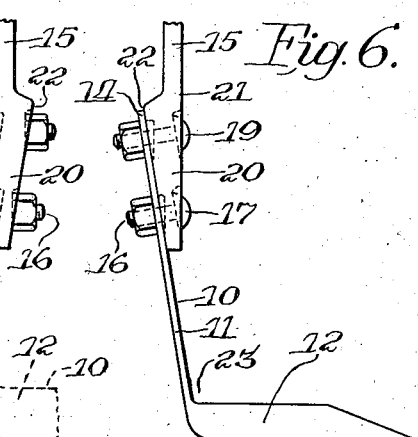
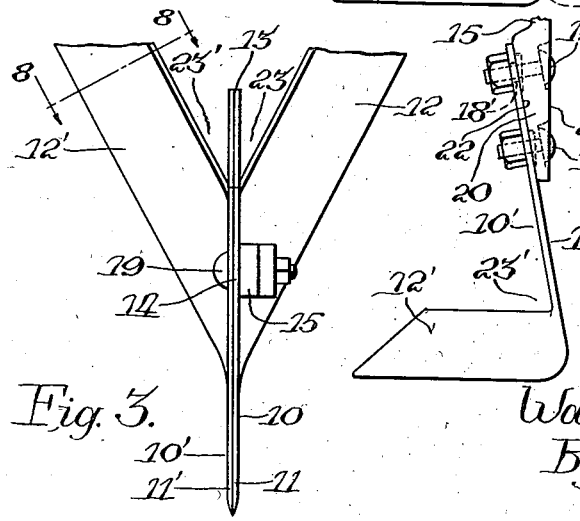
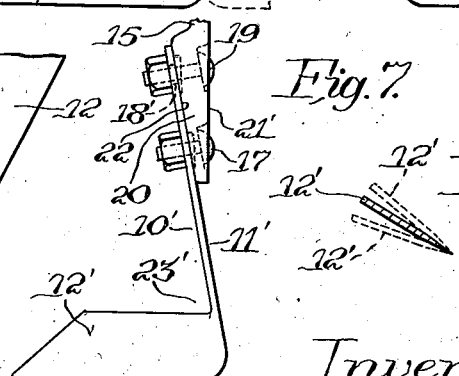
Inventor
Walter R. Peterson
By
Atty.

Patented May 18, 1937

2,080,741

UNITED STATES PATENT OFFICE 2,080,741

KNIFE WEEDER

Walter R. Peterson, Park Ridge, Ill., assignor to International Harvester Company, a corporation of New Jersey Application June 14, 1935, Serial No. 26,647

10 Claims. (Cl. 97—207)

This invention relates to an improved cultivator knife weeder blade, and has for its principal object the provision of a blade which will have a plurality of adjustments so that the blade may be adjusted to run parallel with the ground or at various angles depending upon the result desired.

In various cultivating operations, it is often desirable to change the angle of the blade portion of the weeder with relation to the ground. With the ball and socket universal adjusting shank and blade, it is extremely difficult to make this adjustment and secure uniform setting of all the blades when a plurality of knife weeder blades are used, and since these knife weeder blades are right and left hand and as many as six to eight are used depending on the size of the cultivator, the necessity for a simpler and more accurate means for making these adjustments is readily apparent.

The main object of the invention is to provide a standard or shank for a knife weeder blade in which the bottom shank portion is so proportioned and formed that the weeder blade may be adjusted so that the face of the blade is vertical to the ground or the face of the blade may be placed at a definite angle to the ground and the weeder blade may be adjusted in a vertical plane parallel to the surface of the standard or shank in a plurality of positions.

Another object of the invention is to provide a shank in which a plurality of the weeder blades may be placed back to back and adjusted about the shank to form a hiller blade which may be used in hilling wherever the crops require it.

Another object is to so shape the shank and the weeder blade that the ground between the rows may be left level and the soil thrown either way.

Another object is to provide for adjustment of the shank and a plurality of the weeder blades so that a ditching blade may be formed which will leave a ditch of any desired depth or width and leave the ditch clean with a uniform bank along its side.

Another object is to provide for forming a duck foot blade by positioning a pair of blades on the shank; and, also means whereby, the duck foot type blade for weeding may be tilted at any given angle.

Another object is to provide blades for blocking or thinning such plants as cotton, beets, etc.

Another object is to provide three fixed or predetermined adjustments of the angle of the blade portion of the weeder blade with relation to the ground. This object is accomplished with either the right or left hand weeder blades and using only one cultivator standard for either the right or left hand blades.

In accomplishing the foregoing objects and other minor objects which will hereinafter be more specifically described and defined in the claims, the preferred forms of the improved details of structure are illustrated in the accompanying drawing wherein:

Figure 1 is a front view of the knife weeder blade and shank with a plurality of blades adjusted for hilling;

Figure 2 is a side elevation of the blade and shank as shown in Figure 1;

Figure 3 is a plan view of the shank and blades as shown in Figure 1;

Figure 4 is a front view showing the shank with a weeder blade in position for weeding or blocking and showing in dotted lines a blade of the opposite hand; and, also showing the cutting edge of the knife weeder blade set at its medium setting;

Figure 5 is a front view showing the shank with a weeder blade attached to the shank showing the cutting edge of the weeder blade set at its shallowest setting;

Figure 6 is a front view similar to Figure 5 showing the shank and blade with a blade of the opposite hand to that shown in Figure 5;

Figure 7 is a front view showing the shank with the weeder blade as shown in Figures 4 and 5 attached to the shank showing the cutting edge of the weeder blade set at its maximum setting; and, Figure 8 is a section on line 8—8 of Figure 3 showing the angle of the blade portion with relation to the ground, and this section shows the medium setting which is the same as shown in Figure 4, while the lower dotted position shows the shallowest setting as shown in Figure 5, and the upper dotted position shows the maximum setting as shown in Figure 7.

The invention is herein disclosed in combination with a knife weeder blade and a particular standard having a lower portion adaptable for adjusting the knife weeder blades thereon. The knife weeder blades are generally used in pairs with one having a right hand blade and the other a left hand blade. Each knife weeder blade 10 comprises a forwardly extending cutting blade 11 having a sharp undercut front edge portion. The blade is turned outwardly and rearwardly at the bottom to form a relatively narrow knife portion 12 which is sharpened at the front edge, and this edge is a continuation of the front edge of the forwardly extending cutting blade. Extending rearwardly from the forwardly extending cutting blade 11 and in the same plane is a shield 13 which acts to shield the plants from clods or stones when the blade is used in cultivating.

Intermediate the forwardly extending cutting blade 11 and the shield 13 is located the upwardly extending arcuate portion 14. Secured to this upwardly extending arcuate portion 14 is the shank 15. The shank 15 is pivotally mounted to the upwardly extending arcuate portion 14 at 16 and may be locked thereto by the nut and bolt 17. The blade 10 may be adjusted about the shank 15 in a vertical plane by means of the arcuate slot 18 and is secured in adjusted position by the nut and bolt 19. As shown in Figure 1, a plurality of knife weeder blades 10 and 10' are secured with the adjacent faces formed by the forwardly extending cutting blades 11 and 11' and rearwardly extending shield portions 13 together. These knife weeder blades 10 and 10' are secured to the shank 15 at the lower portion 20 thereof with the faces 11 and 13 of the blades 10 and 10' secured to the face 21. In order that the carriage head bolts 17 and 19 may be flush with the surface, the side portion of the bottom portion of the shank 20 has bosses undercut so that the nuts may be secured against a flat surface. With the blades as shown in Figure 1, the blades may be used for hilling and whenever angular adjustment is needed of the blades in a vertical plane this may be secured by adjusting the blades relative to the shank 14 by the slot 18.

In the modification shown in Figure 4, the blade 10' is secured to the shank 15 similar to the position of the blade 10' as shown in Figure 1 with the single blade as shown in Figure 4. The shank and blade when positioned in this manner are used in blocking or cultivating. The dotted portion of Figure 4 showing the blade 10 thereon shows the opposite hand of the knife weeder blade when positioned for cultivating or blocking. It is to be understood that, when it is necessary, adjustment of the knife weeder blades 10 and 10' in a position in a vertical plane about the shank 15 may be secured by adjusting the blades 10 and 10' by means of the slot 18 as shown in Figure 2. The position of the knife weeder blade 10' on the shank 15 as shown in Figure 5 shows the blade 10' when it is used in blocking or cultivating, with the knife blade portion 12' at an angle to the ground which is sometimes necessary. This is accomplished by having the lower portion 20 of the shank 15 with a surface 22 at an angle to the surface 21 of the shank 15 with the blade secured to this surface 22.

As shown in Figure 5, the knife portion 12' is set at a certain definite angle with respect to the ground. It is to be understood that the angle formed between the faces 22 and 21 may be of any size, but the one chosen here is the one most suitable for all types of cultivating and blocking. In order that the carriage head portions of the bolts 17 and 19 may be flush, the surface 21 is undercut as shown in Figure 5, forming bosses to which the heads of the bolt may be secured in a flush position.

Figure 6 is a view similar to Figure 5, but with a knife weeder blade 10 of the opposite hand. In the structure shown, the shank 15 is used for either right or left hand knife weeder blades 10 and 10'. It is also to be understood that the shank 15 at its upper end is suitably secured to the cultivator beams of a cultivator and that the shanks 15 in turn may be adjusted relative to the cultivator beams by suitable brackets thereon. The blades 10 may be of any suitable material and may be also hardened and heat treated. The cutting edges of the forwardly extending portion 11 and knife blade 12 are suitably sharpened and the surfaces are suitably polished to aid in scouring.

In Figures 4, 5, and 7, is shown the right hand knife weeder blade in three fixed or predetermined adjustments. These adjustments are obtained by the particular form of the lower portion 20 of the shank 15 where the knife weeder blade 10' attaches, one surface being vertical on one side as at 21 and the opposite surface being at an angle to the first surface 21, as at 22. By bolting the blade 10' to the surface 21 as in Figure 4, the knife portion 12' is set at its medium cutting position, as is shown in Figure 8 in the solid lines. When bolted to the face 22 as shown in Figure 5, the shallowest setting of the knife portion 12 is obtained as is shown in the lower dotted section 12' of Figure 8. The third adjustment is obtained as shown in Figure 7 by reversing the shank 15 to that shown in Figures 4 and 5 and securing the knife weeder blade 10' to the surface 22. It may be necessary to adjust the knife weeder blade 10' by the arcuate slot 18' similar to slot 18 as shown in Figure 2, in order to keep the cutting edge of the knife portion 12 or 12' parallel to the ground. It is to be understood that further adjustments may be had in each position shown in Figures 4, 5, and 7, but that the settings of the blade portion 12' as shown in Figure 8 is preferable. The settings previously described provide for three predetermined angles for the blade portion 12' of the knife weeder blade with relation to the ground with either the right or left hand weeder blades and insure a simple and uniform adjustment of all the weeder blades.

The shank 15 may be reversed as shown in Figure 7 to its position as shown in Figures 4 and 5, by loosening the nuts 24 on the U-shaped clamp bolt 25 which, through the strap 26 secures the shank 15 to the shank bracket 27 and reversing the shank 15 in the shank bracket 27 so that the lower portion 20 has its face 22 opposite to the position it was first in, as for instance as shown in Figures 4 and 7. The shank 15 and its attached knife weeder blade 10 or 10' may be adjusted vertically by sliding the shank 15 between the strap 26 and the shank bracket 27 and securing it in its adjusted position.

The shank bracket 27 and its attached shank 15 may also be adjusted on the shovel beam 28 by loosening the nuts 24 on the U-shaped clamp bolt 25 and securing it in its adjusted position. In this manner, the shank 15 may be adjusted vertically with respect to the shovel beam, longitudinally of the shovel beam, and the shank 15 may be also reversed so that the lower portion 20 with its face 22 may be opposite to a former position in order that the knife weeder blades may have their knife portions 12' adjusted in three known settings as shown in Figures 4, 5, 7, and 8.

The standard 15 may also take any other shape as round or square, preferably round, and when a round shank is used and a suitable shank bracket 27, the knife portion 12 and 12' of the blades 10 and 10' may be adjusted laterally in a horizontal plane when used as shown in Figures 4, 5, 6, and 7 in a plurality of positions to provide the best cutting angle for the condition in which the blades are used in cultivating.

When employed for cultivating of row crops, the knife weeder blades are arranged in pairs of opposite hands so that the blades 10 and 10' will travel on opposite sides of the row, as best shown in Figures 4, 5, and 6. As the blades are drawn along the row, the sharp front edges of the forwardly extending portion 11 of the blades 10 cut the soil along each side of the plant row so as to prevent the disturbing of the soil around the roots of the plants. The knife blade portions 12 pass under the soil between the rows of the plants cutting the weeds and stirring the soil.

As best shown in Figures 2 and 3, a V-portion 23 is formed between the rearwardly extending shield portion at 13 and the knife blade portions at 12 so that as the blade 10 or 10', as shown in Figures 4, 5, and 6, are used in cultivating, the shields 13 protect the plants from clods and stones while the fine soil is permitted to pass over the knife surface 12 and entering the V-portion 23 packs up closely about the plants.

The knife portions 12 are usually set at a slightly upwardly inclined angle which will cause the blades to properly weed and loosen the soil; however, in trashy ground the blades can be turned at an abrupt angle to the ground line by adjusting the blades by means of a slot 18 with respect to the shank so that the blades 12 will automatically clear themselves.

When the blades are used for hilling, as best shown in Figures 1 and 3, the soil will be separated between the rows of the plants and carried by the blades 12 towards the rows of the plants and piled against the plants.

The blades, when used in ditching between the rows are in the position as shown in Figures 1, 2, and 3, but the rear portions of the knife weeder blades 10 and 10' are adjusted upwardly at an acute angle relative to the shank 15 by means of the slot 18. With the knife weeder blades thus set for ditching, the blades 12 part the soil, and shape and form a V-shaped ditch between the rows with the blades 12 depositing the soil alongside the plants.

The width, depth, or angle of this ditch may be adjusted by changing the angularity of the blades 10 and 10' by means of the slot 18. When they are used for ditching, it may be necessary to secure another shank 15 to the other weeder blade 10' in order to have a more rigid shank structure because of the earth pressure against the blades 10 and 10'.

When it is necessary to use the blades 10 and 10' for weeding between close rows, the shank and blades may be assembled as shown in Figures 1 and 3, and when positioned in this manner the blades 10 and 10' are close together so that they will function as a unit.

When using these blades, as shown in Figures 4, 5, and 6, to block or thin the plant rows of such crops as sugar beets or cotton, the blades are secured as shown in Figures 4, 5, and 6 and the shanks are adjusted on the cultivator beams so that two blades 12 will overlap leaving the desired width of block between each pair of blades; and, using these blades for blocking or thinning, the cultivator with these blades attached is drawn laterally at right angles across the rows of the planted crops. As the rows are being blocked, the shields 13 prevent the plants left in the blocked space from being disturbed.

The preferred embodiment of the invention herein described is capable of certain modifications without departing from the scope of the invention to be defined in the following claims.

What is claimed is:

1. As an article of manufacture, a cultivator standard having a shank portion, said shank portion having a plurality of adjusting surfaces formed at a given vertical angle to each other and to the plane of the standard and each surface adapted one at a time to secure a cultivator blade thereto, said shank portion having a plurality of holes connecting opposite adjusting surfaces, and adapted for positioning the means for securing a cultivator blade in adjusted position to either one of the opposite adjusting surfaces.

2. The combination with a cultivator standard and a cultivator blade, of a shank portion for said cultivator standard, said shank portion having a plurality of adjusting surfaces formed at a given vertical angle to each other and to the plane of the cultivator standard and each adjusting surface adapted one at a time to secure a cultivator blade thereto, means for pivoting a cultivator blade on either of said adjusting surfaces, and means for securing the aforesaid cultivating blade to the aforesaid adjusting surface in adjusted position.

3. The combination with a cultivator standard and a cultivator blade, of a shank portion for said cultivator standard, said shank portion having a plurality of adjusting surfaces formed at a given vertical angle to each other and to the plane of the cultivator standard and each adjusting surface adapted one at a time to secure a cultivator blade thereto, and means for adjustably attaching a cultivator blade to each adjusting surface one at a time.

4. The combination with a cultivator standard and a cultivator blade, of a shank portion for said cultivator standard, said shank portion having a plurality of adjusting surfaces formed at a given vertical angle to each other and to the plane of the cultivator standard and each adjusting surface adapted one at a time to secure a cultivator blade thereto, and means for securing the aforesaid cultivator blade to any one of the aforesaid adjusting surfaces.

5. The combination of a cultivator standard, a cultivator blade having a knife portion, said standard having a shank portion provided with a plurality of adjusting surfaces formed thereon at a given vertical angle to each other, means providing for reversal of the standard so that the aforesaid adjusting surfaces can be reversed and symmetrically disposed with respect to their original position, each adjusting surface being adapted one at a time to have a cultivator blade secured thereto in each of the aforesaid positions of the cultivator standard, whereby the aforesaid knife portion of the cultivator blade may have a plurality of fixed settings, and means for securing the aforesaid cultivator blade to any one of the aforesaid adjusting surfaces.

6. The combination of a cultivator standard, a cultivator blade having a knife portion, said standard having a shank portion provided with a plurality of adjusting surfaces formed thereon at a given vertical angle to each other and in different angular relations to the standard, means providing for reversal of the standard so that the aforesaid adjusting surfaces can be reversed and symmetrically disposed with respect to their original position, each adjusting surface being adapted one at a time to have a cultivator blade secured thereto in each of the aforesaid positions of the cultivator standard, whereby the aforesaid knife portion of the cultivator blade may have a plurality of fixed settings, and means for securing the aforesaid cultivator blade to any one of the aforesaid adjusting surfaces.

7. The combination of a cultivator standard, a cultivator blade having a knife portion, said standard having a shank portion provided with a plurality of adjusting surfaces formed thereon at a given vertical angle to each other, one of said surfaces lying in the plane of the standard, means providing for reversal of the standard so that the aforesaid adjusting surfaces can be reversed and symmetrically disposed with respect to their original position, each adjusting surface being adapted one at a time to have a cultivator blade secured thereto in each of the aforesaid positions of the cultivator standard, whereby the aforesaid knife portion of the cultivator blade may have a plurality of fixed settings, and means for securing the aforesaid cultivator blade to any one of the aforesaid adjusting surfaces.

8. The combination of a cultivator standard, a cultivator blade having a knife portion, said standard having a shank portion provided with a plurality of adjusting surfaces formed thereon at a given vertical angle to each other, means providing for reversal of the standard so that the aforesaid adjusting surfaces can be reversed and symmetrically disposed with respect to their original position, each adjusting surface being adapted one at a time to have a cultivator blade secured thereto in each of the aforesaid positions of the standard, whereby the aforesaid knife portion of the cultivator blade may have a plurality of fixed settings, and means for adjusting the cultivator blade relative to the cultivator standard in the plane of either of the adjusting surfaces to which it is attached.

9. The combination of a standard having a wedged shaped shank portion at its lower end presenting oppositely disposed cultivator blade attaching surfaces, a cultivator blade having a laterally extending knife portion, and means providing for attachment of the cultivator blade to each adjusting surface one at a time so that the knife portion of the cultivator blade may be adjusted in a plurality of fixed settings.

10. A standard having a wedge-shaped shank portion at its lower end presenting oppositely disposed cultivator blade attaching surfaces, the attaching surfaces being at a given vertical angle to each other, a plane at right angles to the standard intersecting the planes of the attaching surfaces in parallel lines.

WALTER R. PETERSON.